US012524871B2

(12) United States Patent
Cheng

(10) Patent No.: US 12,524,871 B2
(45) Date of Patent: Jan. 13, 2026

(54) MARK HOLE POSITIONING METHOD AND APPARATUS, ASSEMBLY DEVICE, AND STORAGE MEDIUM

(71) Applicant: HONOR DEVICE CO., LTD., Shenzhen (CN)

(72) Inventor: Xi Cheng, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 295 days.

(21) Appl. No.: 18/553,885

(22) PCT Filed: May 22, 2023

(86) PCT No.: PCT/CN2023/095634
§ 371 (c)(1),
(2) Date: Oct. 4, 2023

(87) PCT Pub. No.: WO2024/021803
PCT Pub. Date: Feb. 1, 2024

(65) Prior Publication Data
US 2024/0185414 A1    Jun. 6, 2024

(30) Foreign Application Priority Data

Jul. 25, 2022 (CN) .......................... 202210873883.1

(51) Int. Cl.
G06T 7/00    (2017.01)
G06T 1/00    (2006.01)
(Continued)

(52) U.S. Cl.
CPC ............ *G06T 7/001* (2013.01); *G06T 1/0014* (2013.01); *G06T 5/70* (2024.01); *G06T 7/13* (2017.01);
(Continued)

(58) Field of Classification Search
CPC ........ H04N 23/54; H04N 23/55; H04N 23/57; H04N 23/51; H04N 23/00; H04N 23/52;
(Continued)

(56) References Cited

U.S. PATENT DOCUMENTS

| 6,268,920 B1 * | 7/2001 | Ohlig ........................ G03F 9/00 356/399 |
| 2003/0086600 A1 * | 5/2003 | Ganot .................. H05K 3/4679 382/145 |

(Continued)

FOREIGN PATENT DOCUMENTS

| CN | 101334263 A | 12/2008 |
| CN | 102806554 A | 12/2012 |

(Continued)

OTHER PUBLICATIONS

Jiang Xin; "Research on Measurement Method of Hole Shape and Position Parameters of Support Plate of Nuclear Steam Generator"; Dissertation for the Doctor Degree; May 15, 2022; 129Pages(with English abstract).

(Continued)

*Primary Examiner* — Alex Kok S Liew
(74) *Attorney, Agent, or Firm* — WOMBLE BOND DICKINSON (US) LLP

(57) ABSTRACT

A mark hole positioning method is provided. The assembly device obtains a target image including a to-be-positioned mark hole, and extracts contour points of the mark hole from the target image. Next, the assembly device generates a circle center set of auxiliary circles by using the contour points as circle centers of the auxiliary circles. Then, the assembly device traverses each circle center in the circle center set and each radius value in a radius set, generates a plurality of auxiliary circles in the target image, and accumulates, for different radius values, a quantity of times of intersection between pixels in the target image and the
(Continued)

plurality of auxiliary circles. Finally, sub-pixel positioning information of the mark hole is determined and the mark hole is positioned based on the sub-pixel positioning information of the mark hole.

19 Claims, 10 Drawing Sheets

(51) Int. Cl.
*G06T 5/70* (2024.01)
*G06T 7/13* (2017.01)
*G06T 7/60* (2017.01)
*G06T 7/73* (2017.01)

(52) U.S. Cl.
CPC .................. *G06T 7/60* (2013.01); *G06T 7/73* (2017.01); *G06T 2207/30141* (2013.01)

(58) Field of Classification Search
CPC ........ H04N 23/40; H04N 25/00; H04N 23/45; H04N 23/60; H04N 1/00204; H04N 13/344; H04N 23/50; H04N 1/00127; H04N 1/00244; H04N 1/00326; H04N 1/00358; H04N 1/00376; H04N 1/00567; G06F 3/0321; G06F 3/03545; G06F 3/016; G06F 3/011; G06F 3/013; H05K 1/0269; H05K 3/0082; H05K 3/0008; H05K 2201/09918; H05K 2201/09063; H05K 2203/167; H05K 2201/10151; H05K 3/4652; H05K 7/205; H05K 1/181; H05K 2201/10689

See application file for complete search history.

(56) References Cited

U.S. PATENT DOCUMENTS

| | | | |
|---|---|---|---|
| 2013/0113813 A1 | 5/2013 | Wu et al. | |
| 2021/0191552 A1* | 6/2021 | Bok | G06F 1/1681 |
| 2021/0312651 A1 | 10/2021 | Wang | |

FOREIGN PATENT DOCUMENTS

| | | |
|---|---|---|
| CN | 103093222 A | 5/2013 |
| CN | 103235939 A | 8/2013 |
| CN | 102878941 B | 4/2014 |
| CN | 105894544 A | 8/2016 |
| CN | 106204542 A | 12/2016 |
| CN | 108205395 A | 6/2018 |
| CN | 112288693 A | 1/2021 |
| CN | 113436461 A | 9/2021 |
| CN | 113706607 A | 11/2021 |
| CN | 113935953 A | 1/2022 |
| CN | 114511630 A | 5/2022 |
| CN | 114648518 A | 6/2022 |
| CN | 115082552 A | 9/2022 |
| JP | 2020141712 A | 9/2020 |

OTHER PUBLICATIONS

Huang Yonghua et al; "A Method of Locating Detection for the Installation Holes of Brake Pads Based on Modified Hough Transform"; Journal of Guizhou University( Natural Sciences); Feb. 15, 2019; 6Pages(with English abstract).

Lv Dewen; "Design of communications system of cable tunnel inspection robot based on ZigBee";Journal of Inner Mongolia University of Technology; Aug. 15, 2021; 6Pages(with English abstract).

Jule-zhou; "How to determine the center of a circle"; Retrieved from the internet, URL:https://blog.csdn.net/jule_zhou/article/details/115623069; Apr. 12, 2021; 8Pages.

Arjun Ramakrishnan et al; "Spray characterisation using combined radon and hough transforms"; 2015 IEEE International Conference on Signal Processing, Informatics, Communication and Energy Systems (SPICES); Feb. 19, 2015; 5 pages.

* cited by examiner

MARK HOLE POSITIONING METHOD AND APPARATUS, ASSEMBLY DEVICE, AND STORAGE MEDIUM

CROSS-REFERECNE TO RELATED APPLICATIONS

This application is a national stage of International Application No. PCT/CN2023/095634, filed on May 22, 2023, which claims priority to Chinese Patent Application No. 202210873883.1. filed on Jul. 25, 2022. The disclosures of both of the aforementioned applications are hereby incorporated by reference in their entireties.

TECHNICAL FIELD

This application relates to the field of machine vision technologies, and in particular, to a mark hole positioning method and apparatus, an assembly device, and a storage medium.

BACKGROUND

Machine vision is a technology that replaces human eyes with machines for measurement and determining. In intelligent manufacturing, machine vision is widely used for positioning a mark (Mark) hole in a mobile phone middle frame, a printed circuit board (Printed Circuit Board, PCB), a plate, or the like. Image positioning of the Mark hole may be implemented through machine vision, and then a motion control system is used to complete mechanical coordinate positioning, so that a manipulator can implement operations such as assembling the Mark hole based on positioned mechanical coordinates.

In a related technology, image positioning of the Mark hole may be performed based on Hough (Hough) transform or template matching. The Hough transform first clusters pixels that are in an image of a Mark hole and that have a specific relationship (for example, a straight line relationship or a circle relationship), and then uses a clustered pixel with a largest accumulated quantity as a detection result. Template matching may generally fit a circle on the image of the Mark hole by using a least square method, and then calculate an error between a point on a contour that needs to be fitted and a template circle equation, to reduce an error value by continuously adjusting a circle center of the circle and a radius parameter.

However, in the foregoing positioning of the Mark hole through the Hough transform or template matching, when there is an irregular edge such as a convex hull or a burr in the Mark hole, or when the Mark hole is partially shielded, a positioning deviation is relatively large. Therefore, an existing positioning manner of the Mark hole cannot improve positioning robustness of the Mark hole while ensuring positioning precision of the Mark hole.

SUMMARY

This application provides a mark hole positioning method and apparatus, an assembly device, and a storage medium, to improve positioning robustness of a mark hole while ensuring positioning precision of the mark hole.

According to a first aspect, this application provides a mark hole positioning method, applied to an assembly device. The method provided in this application includes:

The assembly device first obtains a target image including a to-be-positioned mark hole, and extracts contour points of the mark hole from the target image. Next, the assembly device generates a circle center set of auxiliary circles by using the contour points as circle centers of the auxiliary circles, where the auxiliary circle is used to position a circle center of the mark hole in the target image. Then, the assembly device traverses each circle center in the circle center set and each radius value in a radius set of the auxiliary circles, generates a plurality of auxiliary circles in the target image, and accumulates, for different radius values of the auxiliary circles, a quantity of times of intersection between pixels in the target image and the plurality of auxiliary circles. Finally, the assembly device determines sub-pixel positioning information of the mark hole based on a first pixel that is in the pixels and that has a largest quantity of intersection times with the plurality of auxiliary circles and a radius value of an auxiliary circle corresponding to the first pixel, where the sub-pixel positioning information includes pixel coordinates of the circle center of the mark hole and a radius of the mark hole, and positions the mark hole based on the sub-pixel positioning information of the mark hole.

According to the mark hole positioning method provided in this application, the plurality of auxiliary circles are generated on the target image by using the contour points of the mark hole as the circle centers of the auxiliary circles, so that the quantity of times of intersection between the auxiliary circles and the pixels in the target image is used to position the mark hole. When there is an irregular edge such as a convex hull or a burr in the mark hole, or when the mark hole is partially shielded, because most contour points of the mark hole are regularly distributed, the quantity of times of intersection between the auxiliary circles and the pixels in the target image is relatively slightly affected, and positioning precision of the mark hole is also relatively slightly affected. Therefore, the mark hole positioning method provided in this application improves positioning robustness of the mark hole while ensuring positioning precision of the mark hole.

In a possible implementation, that the assembly device obtains a target image including a to-be-positioned mark hole may include: The assembly device first obtains a raw image of the mark hole, and then the assembly device obtains the target image from the raw image based on a preset first positioning circle and a preset second positioning circle. A radius of the first positioning circle is a maximum radius of the mark hole, and a radius of the second positioning circle is a minimum radius of the mark hole.

In this way, the target image can be obtained from the raw image by using the preset first positioning circle and the preset second positioning circle, so that subsequent positioning of the mark hole is performed by using the target image, improving mark hole positioning efficiency.

In a possible implementation, that the assembly device obtains the target image from the raw image based on a preset first positioning circle and a preset second positioning circle may include: The assembly device first pre-positions, by including the mark hole in the first positioning circle, a target region in which the mark hole is located. Then, the assembly device uses the second positioning circle to check whether a radius of the mark hole in the target region is greater than the minimum radius. If the radius of the mark hole in the target region is greater than the minimum radius, the assembly device captures an image of the target region from the raw image to generate the target image. If the radius of the mark hole in the target region is less than the minimum radius, the assembly device determines that the mark hole in the target region is an invalid mark hole.

In this way, the target region in which the mark hole is located is determined by using the preset first positioning circle, and it is ensured, by using the preset second positioning circle, that the mark hole in the target region meets a requirement, so that it can be ensured that the target image obtained from the raw image is an image including the mark hole.

In a possible implementation, the target image is a square image, and a side length of the square image is equal to a diameter of the first positioning circle.

In a possible implementation, the radius value in the radius set is less than or equal to the radius of the first positioning circle and greater than or equal to the radius of the second positioning circle.

In a possible implementation, before extracting the contour points of the mark hole from the target image, the assembly device may further perform grayscale image conversion on the target image, and perform Gaussian filtering on a converted target image to remove Gaussian noise in the converted target image.

In this way, the assembly device can perform grayscale conversion and noise filtering on the target image, so that a contour of the mark hole is subsequently quickly and accurately identified.

In a possible implementation, that the assembly device extracts contour points of the mark hole from the target image includes: The assembly device first calculates a pixel gradient change value of each pixel in the target image by using a gradient operator. Finally, the assembly device determines a pixel with a largest pixel gradient change value in the target image as the contour point.

In a possible implementation, that the assembly device positions the mark hole based on a first pixel that is in the pixels and that has a largest quantity of intersection times with the plurality of auxiliary circles and a radius value of an auxiliary circle corresponding to the first pixel includes: The assembly device first converts the sub-pixel positioning information of the mark hole into mechanical positioning information of the mark hole. Then, the assembly device positions the mark hole based on the mechanical positioning information of the mark hole.

In a possible implementation, that the assembly device determines sub-pixel positioning information of the mark hole based on a first pixel that is in the pixels and that has a largest quantity of intersection times with the plurality of auxiliary circles and a radius value of an auxiliary circle corresponding to the first pixel includes: The assembly device first generates a first matrix corresponding to the first pixel, where the first matrix includes three-dimensional information, and the three-dimensional information includes coordinates of the first pixel in two directions and the radius value of the auxiliary circle corresponding to the first pixel. Next, the assembly device determines a neighborhood matrix corresponding to single-dimensional information in the three-dimensional information. Then, the assembly device separately determines sub-pixel positioning information corresponding to the three-dimensional information based on the neighborhood matrix corresponding to the single-dimensional information and the first matrix. Finally, the assembly device determines the sub-pixel positioning information of the mark hole based on the sub-pixel positioning information corresponding to the three-dimensional information.

In a possible implementation, the neighborhood matrix includes a first neighborhood matrix and a second neighborhood matrix, target dimension information in the first neighborhood matrix is less than target dimension information in the first matrix, target dimension information in the second neighborhood matrix is greater than the target dimension information in the first matrix, and the target dimension information is dimension information corresponding to the first neighborhood matrix and the second neighborhood matrix.

In a possible implementation, that the assembly device separately determines sub-pixel positioning information corresponding to the three-dimensional information based on the neighborhood matrix corresponding to the single-dimensional information and the first matrix includes: The assembly device first determines a second matrix from the first neighborhood matrix corresponding to the single-dimensional information, and determines a third matrix from the second neighborhood matrix corresponding to the single-dimensional information. Then, the assembly device fits, by using a Gaussian distribution model, the first matrix, the second matrix, and the third matrix that correspond to the single-dimensional information, to separately determine the sub-pixel positioning information corresponding to the three-dimensional information.

In a possible implementation, that the assembly device determines the sub-pixel positioning information of the mark hole based on the sub-pixel positioning information corresponding to the three-dimensional information includes: The assembly device first determines sub-pixel coordinates of the first pixel in two directions as the pixel coordinates of the circle center of the mark hole. Then, the assembly device determines the radius value of the auxiliary circle corresponding to the first pixel as the radius of the mark hole.

According to a second aspect, this application further provides a mark hole positioning apparatus, and the apparatus includes:

an obtaining module, configured to obtain a target image including a to-be-positioned mark hole;

an intersection module, configured to extract contour points of the mark hole from the target image; generate a circle center set of auxiliary circles by using the contour points as circle centers of the auxiliary circles, where the auxiliary circle is used to position a circle center of the mark hole in the target image; and traverse each circle center in the circle center set and each radius value in a radius set of the auxiliary circles, and generate a plurality of auxiliary circles in the target image; and a positioning module, configured to accumulate, for different radius values of the auxiliary circles, a quantity of times of intersection between pixels in the target image and the plurality of auxiliary circles; and position the mark hole based on a first pixel that is in the pixels and that has a largest quantity of intersection times with the plurality of auxiliary circles and a radius value of an auxiliary circle corresponding to the first pixel.

According to a third aspect, this application further provides an assembly device, including a processor and a memory. The memory is configured to store code instructions; and the processor is configured to run the code instructions to enable an electronic device to perform the mark hole positioning method according to any one of the first aspect or the implementations of the first aspect.

According to a fourth aspect, this application further provides a computer-readable storage medium. The computer-readable storage medium stores instructions, and when the instructions are executed, a computer is enabled to perform the mark hole positioning method according to any one of the first aspect or the implementations of the first aspect.

It should be understood that the second aspect to the fourth aspect of this application correspond to the technical solution of the first aspect of this application, and the beneficial effects obtained by each aspect and the corresponding feasible implementations are similar. Details are not repeated herein again.

DESCRIPTION OF EMBODIMENTS

Figure 1:
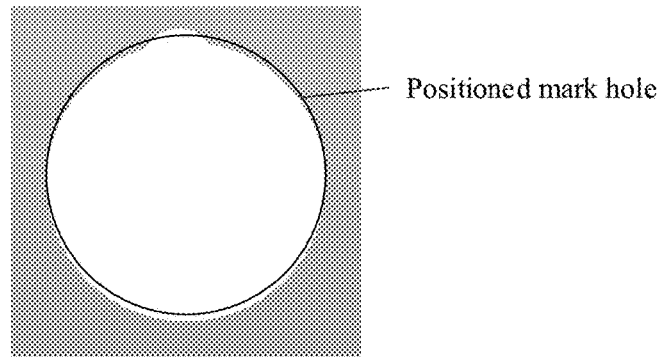
FIG. 1 is a schematic diagram of positioning of a mark hole according to an embodiment of this application.

To clearly describe technical solutions in embodiments of this application, in embodiments of this application, words such as "first" and "second" are used to distinguish between same items or similar items with basically the same functions and effects. For example, a first value and a second value are merely intended to distinguish between different values, but not to limit a sequential order thereof. A person skilled in the art may understand that the words such as "first" and "second" do not limit a quantity and an execution sequence, and the words such as "first" and "second" do not indicate a definite difference.

It should be noted that, in this application, a word such as "exemplarily" or "for example" is used to represent giving an example, an illustration, or a description. Any embodiment or design solution described as "exemplarily" or "for example" in this application should not be construed as being preferred or advantageous over other embodiments or design solutions. Exactly, use of the word such as "exemplarily" or "for example" is intended to present related concepts in a specific manner.

In this application, "at least one" means one or more, and "a plurality of" means two or more. The term "and/or" describes an association relationship between associated objects, and indicates that three relationships may exist. For example, A and/or B may indicate the following cases: Only A exists, both A and B exist, and only B exists, where A and B may be singular or plural. The character "/" usually indicates an "or" relationship between the associated objects. "At least one of the following items" or a similar expression means any combination of these items, including any combination of a single item or a plurality of items. For example, at least one of a, b, or c may represent a, b, c, a-b, a-c, b-c, or a-b-c, where a, b, and c may be singular or plural.

Machine vision is a technology that replaces human eyes with machines for measurement and determining. In intelligent manufacturing, machine vision is widely used for positioning a mark (Mark) hole in a mobile phone middle frame, a printed circuit board (Printed Circuit Board, PCB), a plate, or the like. Image positioning of the Mark hole may be implemented through machine vision, and then a motion control system is used to complete mechanical coordinate positioning, so that a manipulator can implement operations such as assembling the Mark hole based on positioned mechanical coordinates.

Because positioning of the Mark hole is a premise for a subsequent operation, positioning precision of the Mark hole affects completion quality of the subsequent operation. If positioning of the Mark hole overlaps, a quality problem such as misalignment during screen fitting or scraping may occur when the manipulator performs subsequent operations such as assembling the Mark hole. In a related technology image positioning of the Mark hole may be performed based on Hough (Hough) transform or template matching, to ensure positioning precision of the Mark hole.

The Hough transform is a method for clustering pixels that are in an image of a Mark hole and that have a specific relationship. For example, pixels having a straight line relationship or a circle relationship may be clustered, and then a clustered pixel with a largest accumulated quantity is used as a detection result. It should be noted that, because the Hough transform uses information about a boundary contour line of the Mark hole, a boundary contour line of the image of the Mark hole needs to be first obtained in an identification process.

Template matching is a mode identification method. A detection result is obtained by calculating a similarity relationship between elements on a template and a target image. For example, through template matching, a least square method may be used for an image of a Mark hole to fit a circle, and an error between a point on a contour that needs to be fitted and a template circle equation is calculated. A circle center and a radius parameter of a fitted circle are constantly adjusted to minimize an error value.

However, for the foregoing positioning of the Mark hole performed through the Hough transform or template matching, when a contour of the Mark hole is clear, positioning precision and a positioning success rate are both relatively high. However, when there is an irregular edge such as a convex hull or a burr in the Mark hole, or when the Mark hole is partially shielded, a positioning deviation is relatively large.

Figure 2:
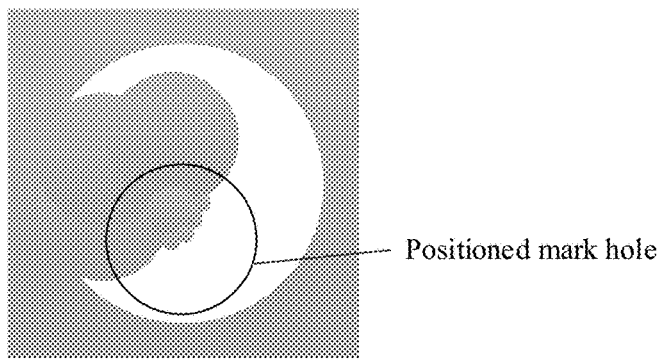
FIG. 2 is a schematic diagram of positioning of another mark hole according to an embodiment of this application.

For example, FIG. 1 is a schematic diagram of positioning of a mark hole according to an embodiment of this application. FIG. 2 is a schematic diagram of positioning of another mark hole according to an embodiment of this application. There is a convex hull on the mark hole shown in FIG. 1, and the mark hole shown in FIG. 2 is partially shielded. For the mark hole shown in FIG. 1, if the mark hole is positioned in a manner of fitting a circle by using the least square method, a center of a fitted circle deviates from a center of an actual circle due to the convex hull on an edge, causing a relatively large positioning deviation of the mark hole. For the mark hole shown in FIG. 2, if the mark hole is positioned through Hough transform, a circle identification error is easily caused because a circle center is shielded, affecting positioning precision of the mark hole.

Therefore, an existing positioning manner of the mark hole cannot improve positioning robustness of the mark hole while ensuring positioning precision of the mark hole.

In view of this, this application provides a mark hole positioning method and apparatus, an assembly device, and a storage medium. A plurality of auxiliary circles are generated on a target image by using contour points of a mark hole as circle centers of auxiliary circles, so that a quantity of times of intersection between the auxiliary circles and pixels in the target image is used to position the mark hole. When there is an irregular edge such as a convex hull or a burr in the mark hole, or when the mark hole is partially shielded, because most contour points of the mark hole are regularly distributed, the quantity of times of intersection between the auxiliary circles and the pixels in the target image is relatively slightly affected, and positioning precision of the mark hole is also relatively slightly affected. Therefore, the mark hole positioning method provided in this application improves positioning robustness of the mark hole while ensuring positioning precision of the mark hole.

The following describes an application scenario of the mark hole positioning method in this application.

Figure 3:
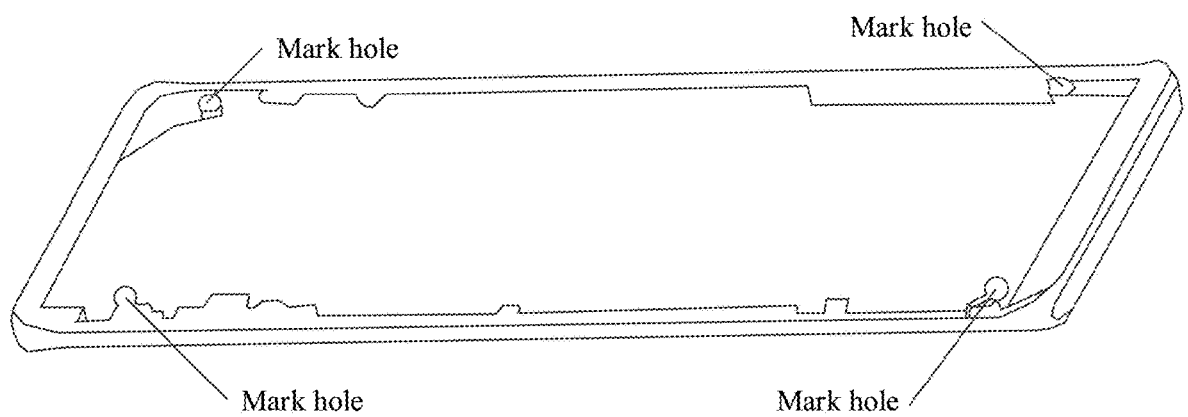
FIG. 3 is a schematic diagram of a mobile phone middle frame according to an embodiment of this application.

FIG. 3 is a schematic diagram of a mobile phone middle frame according to an embodiment of this application. As shown in FIG. 3, a plurality of mark holes may be provided on the mobile phone middle frame. When an operation is performed on the mobile phone middle frame on an assembly device, a location of the mobile phone middle frame may be positioned by positioning the mark holes on the mobile phone middle frame.

The assembly device is a device configured to assemble each component.

It should be understood that an operation of the assembly device after the Mark hole is positioned is not limited in this embodiment of this application. For example, a glue dispensing operation, a screen assembly operation, and a battery assembly operation may be performed after the Mark hole is positioned.

It should be noted that the application scenario of the foregoing mark hole positioning method does not constitute a limitation on this application. The mark hole positioning method provided in this application may be applied to any scenario in which a Mark hole needs to be positioned.

For clarity and brevity of the following embodiments, a structure of an assembly device in embodiments of this application is explained.

Figure 4:
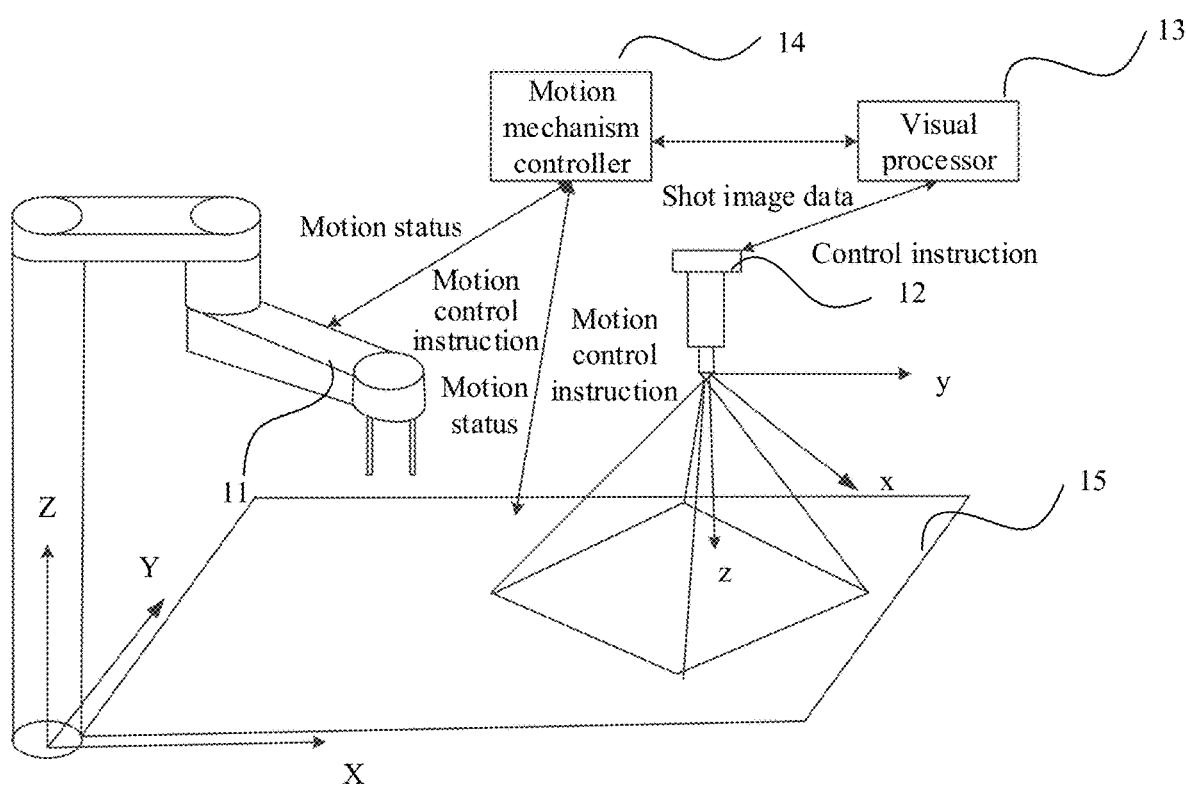
FIG. 4 is a schematic diagram of a structure of an assembly device according to an embodiment of this application.

FIG. 4 is a schematic diagram of a structure of an assembly device according to an embodiment of this application. As shown in FIG. 4, the assembly device includes an operation mechanism 11, one or more cameras 12, a visual processor 13, a motion mechanism controller 14, and a support platform 15.

It may be understood that the structure of the assembly device shown in this embodiment does not constitute a specific limitation on the device. In some other embodiments, the assembly device may include more or fewer components than those shown in the figure, or combine some components, or split some components, or have different component arrangements. The components shown in the figure may be implemented by hardware, software, or a combination of software and hardware.

The operation mechanism 11 (or referred to as a manipulator) is configured to grab and move a to-be-assembled part, such as a mobile phone screen or a mobile phone middle frame. The support platform 15 is configured to support another to-be-assembled part.

In an example embodiment, a positioning base for fastening a to-be-assembled part is disposed on the support platform 15, and the support platform 15 can move in a translational manner or a lift manner, so that the positioning base implements movement in a horizontal direction and a vertical direction. Further, a part fastened on the positioning base moves with the positioning base.

For example, if a part A needs to be assembled to a part B, the part B may be fastened on the support platform 15, the part A is clamped by using the operation mechanism 11, and further the part A is assembled to the part B by moving the operation mechanism 11 and/or the support platform 15.

The camera 12 (or referred to as a video camera) is configured to shoot an image of a to-be-assembled part to obtain a location of the to-be-assembled component.

It should be noted that an image sensor is an important part of a camera. According to different types of elements that constitute image sensors, the image sensors may be classified into two types: a charge coupled device (Charge coupled Device, CCD) and a complementary metal oxide semiconductor (Complementary Metal Oxide Semiconductor, CMOS). A camera including a CCD element is referred to as a CCD camera, and a camera including a CMOS element is referred to as a CMOS camera. The camera 12 may be either of the CCD camera and the CMOS camera.

Both the camera 12 and the motion mechanism controller 14 are connected to the visual processor 13 by using a communication bus.

The camera 12 may receive a photographing instruction (that is, a first photographing instruction) sent by the visual processor 13. In addition, the camera 12 may send a shot image to the visual processor 13, so that the visual processor 13 performs a further operation based on the image.

The visual processor 13 may obtain location coordinates of a target object or an object on a target object based on the image shot by the camera 12, further generate, based on the location coordinates, a motion control instruction (that is, a first motion control instruction) for controlling the operation mechanism 11 or the support platform 15, and send the motion control instruction to the motion mechanism controller 14. The motion mechanism controller 14 controls an action of the operation mechanism 11 or the support platform 15 according to the motion control instruction, for example, controls the operation mechanism 11 to grab an object or move, or controls the support platform 15 to move in a translational manner or a lift manner or perform a related operation of the Mark hole.

The location coordinates obtained by the camera 12 are based on an image, that is, an xyz coordinate system in FIG. 2. A motion mechanism (the operation mechanism and the support platform) is based on a mechanical motion coordinate system, that is, an XYZ coordinate system in FIG. 2. Origins, positive directions, and unit lengths of the two coordinate systems are different. Therefore, a location relationship between the visual coordinate system and the mechanical motion coordinate system needs to be calibrated. This calibration process may be implemented by the visual processor 13 by executing a corresponding calibration program.

The visual processor 13 may include one or more processing units. For example, the visual processor 13 may include a calibration processor, a motion control processor, and the like. The calibration processor is mainly configured to run a calibration program to implement mapping from the visual coordinate system to the mechanical motion coordinate system. The motion control processor is mainly configured to control an operation of each motion mechanism, such as the operation mechanism 11 or the support platform 15.

In an embodiment of this application, functions of the visual processor 13 and the motion mechanism controller 14 may be integrated into a same processor. This is not limited in this application.

It may be understood that the foregoing mark hole positioning method may be implemented by using the mark hole positioning apparatus provided in this embodiment of the present disclosure. The mark hole positioning apparatus may be a part or a whole of a device, for example, the foregoing assembly device or the processor of the assembly device.

The following describes, in detail by using an assembly device as an example and with reference to specific embodiments, the technical solutions of this application and how the foregoing technical problems are resolved by using the technical solutions of this application. The following several specific embodiments may be implemented independently, or may be combined with each other. For same or similar concepts or processes, details may not be described again in some embodiments.

Figure 5:
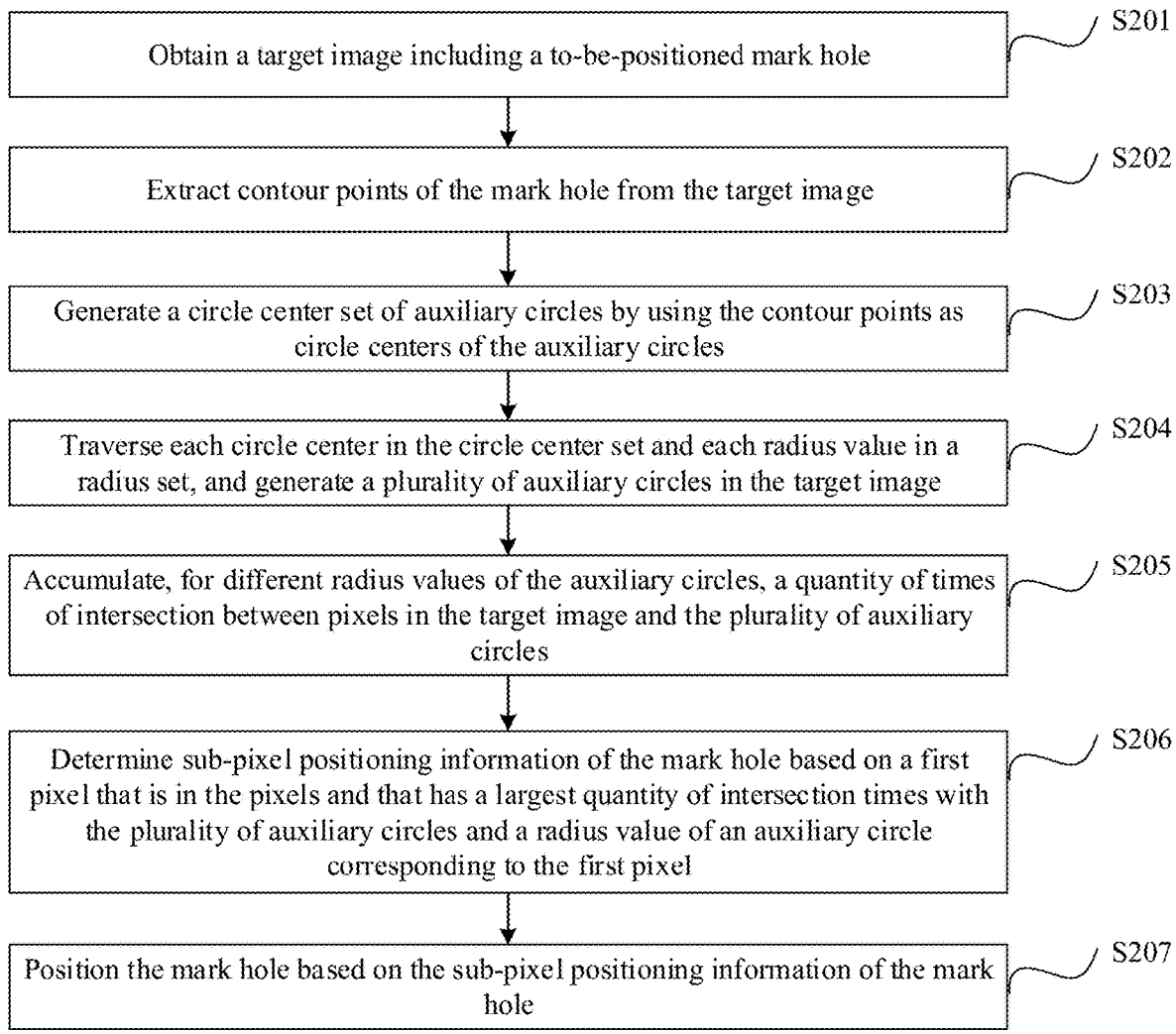
FIG. 5 is a schematic flowchart of a mark hole positioning method according to an embodiment of this application.

FIG. 5 is a schematic flowchart of a mark hole positioning method according to an embodiment of this application. The mark hole positioning method provided in this embodiment is applied to an assembly device, to position a mark hole on a to-be-assembled object. As shown in FIG. 5, the mark hole positioning method includes the following steps:

S201: Obtain a target image including a to-be-positioned mark hole.

In this application, when assembling is performed, if a mark (Mark) hole on a to-be-assembled component needs to be positioned, the target image including the to-be-positioned mark hole may be obtained.

A shape of the Mark hole is not limited in this embodiment of this application. The shape of the Mark hole may be a circle, or may be another regular polygon, for example, a regular hexagon.

The target image may be an image of a region of interest (Region Of Interest, ROI) in a raw image. In this application, an ROI of the assembly device when positioning the mark hole is a region including the to-be-positioned mark hole.

It should be understood that how to obtain the target image is not limited in this embodiment of this application. In some embodiments, the assembly device may first obtain the raw image of the mark hole. Then, the assembly device may obtain the target image from the raw image based on a preset first positioning circle and a preset second positioning circle.

It should be noted that how to set the first positioning circle and the second positioning circle is not limited in this embodiment of this application. In some embodiments, a radius of the first positioning circle and a radius of the second positioning circle may be set based on a radius of the mark hole. For example, the radius of the first positioning circle is a maximum radius of the mark hole, and the radius of the second positioning circle is a minimum radius of the mark hole.

In some embodiments, an image collection system is usually disposed in the assembly device. If the mark hole of the to-be-assembled component needs to be positioned, the raw image of the mark hole may be shot by using a CCD camera in the image collection system. Then, the raw image of the mark hole is processed to obtain, from the raw image, the target image including the to-be-positioned mark hole.

It should be understood that the preset first positioning circle and the preset second positioning circle are used to position the target image from the raw image. In some embodiments, the assembly device may first pre-position, by including the mark hole in the first positioning circle, a target region in which the mark hole is located. Then, the assembly device uses the second positioning circle to check whether a radius of the mark hole in the target region is greater than or equal to the minimum radius.

If the radius of the mark hole in the target region is greater than or equal to the minimum radius, the assembly device captures an image of the target region from the raw image to generate the target image. If the radius of the mark hole in the target region is less than the minimum radius, the assembly device determines that the mark hole in the target region is an invalid mark hole. The assembly device determines that the mark hole in the target region is an invalid mark hole.

Figure 6:
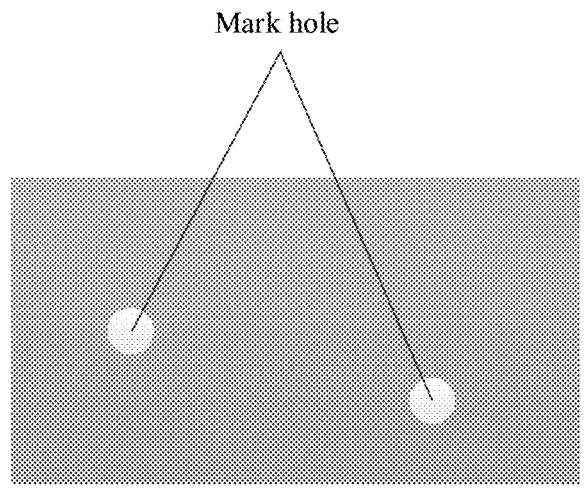
FIG. 6 is a schematic diagram of a raw image according to an embodiment of this application.
Figure 7:
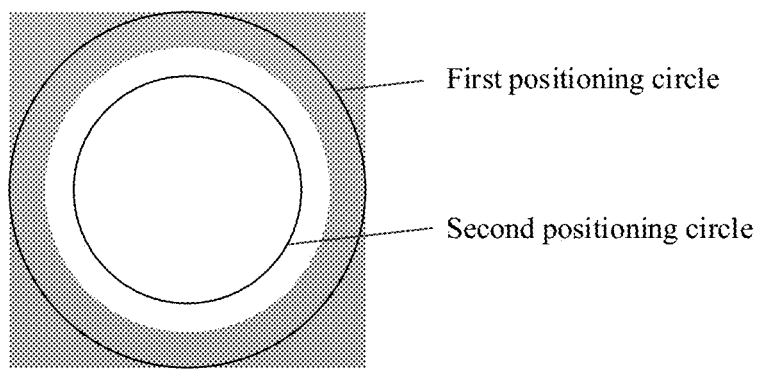
FIG. 7 is a schematic diagram of a target image according to an embodiment of this application.

For example, FIG. 6 is a schematic diagram of a raw image according to an embodiment of this application. FIG. 7 is a schematic diagram of a target image according to an embodiment of this application. As shown in FIG. 6, the raw image shot by the image collection system includes two mark holes, and the assembly device may collect target images of the two mark holes one by one. A process of positioning the target image may be implemented by using the first positioning circle and the second positioning circle. As shown in FIG. 7, first, the assembly device may determine, by using the first positioning circle, whether a pre-positioned mark hole meets a radius upper limit. If the first positioning circle may include the pre-positioned mark hole, the assembly device determines that the pre-positioned mark hole meets the radius upper limit. Correspondingly, as shown in FIG. 7, a region positioned by the first positioning circle by including the pre-positioned mark hole may be a target region in which the mark hole is located. Then, the first positioning circle may be used to determine whether the pre-positioned mark hole meets a radius lower limit. If a radius of the mark hole in the target region is greater than or equal to the radius of the second positioning circle, the assembly device determines that the pre-positioned mark hole meets the radius lower limit. Correspondingly, the pre-positioned mark hole is qualified through checking, and an image of the target region may be captured as the target image. If the radius of the mark hole in the target region is less than the radius of the second positioning circle, the assembly device determines that the pre-positioned mark hole is an invalid mark hole, and no subsequent positioning operation is required.

It should be understood that how to capture the target image is not limited in this embodiment of this application. In some embodiments, the target image may be a square image, and a side length of the square image is equal to a diameter of the first positioning circle. For example, as shown in FIG. 7, the target image may be a square image. By using a circle center of the first positioning circle as a center of the target image, the target image may be captured from the raw image.

In this application, by using the foregoing positioning manner of the target image, identification and positioning can be completed only by ensuring that a circle center of the mark hole falls within a range of the first positioning circle, which can allow a device to move or a material tolerance to cause the mark hole to be offset to a pixel equivalent of the radius of the first positioning circle, thereby extending a dynamic range of visual positioning of the mark hole. In addition, identification is not interfered by the second positioning circle inside the mark hole, that is, a case in which a plurality of circles are identified is not presented, which causes a system alarm. By changing the radius of the first positioning circle and the radius of the second positioning circle, identification of mark holes of different sizes can be implemented.

In some embodiments, after obtaining the target image, the assembly device further performs grayscale image conversion on the target image, and performs Gaussian filtering on a converted target image to remove Gaussian noise in the converted target image.

It should be understood that how to perform Gaussian filtering on the target image is not limited in this embodiment of this application. In some embodiments, the assembly device may perform Gaussian filtering by using a 3*3 kernel, to remove the Gaussian noise in the target image.

It should be understood that how to perform grayscale image conversion on the target image is not limited in this embodiment of this application, and a common grayscale image conversion manner may be used.

S202: Extract contour points of the mark hole from the target image.

In this step, after obtaining the target image including the to-be-positioned mark hole, the assembly device may extract the contour points of the mark hole from the target image.

The contour point of the mark hole may be a pixel of the mark hole on a line of an edge of the target image.

It should be understood that how to extract the contour points of the mark hole is not limited in this embodiment of this application. In some embodiments, the assembly device may first calculate a pixel gradient change value of each pixel in the target image by using a gradient operator. Then, the assembly device may determine a pixel with a largest pixel gradient change value in the target image as the contour point.

The gradient operator may be a gradient operator such as a canny (canny), a sobel (sobel), or a laplacian (laplacian).

Figure 8:
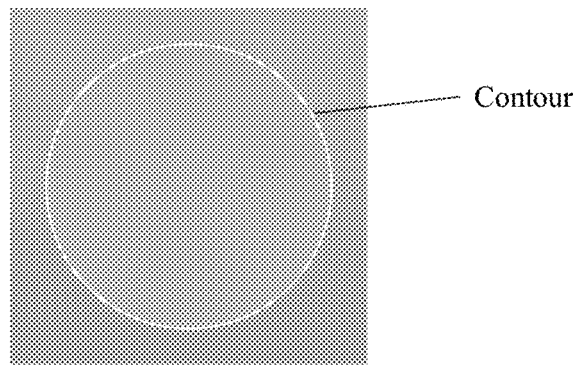
FIG. 8 is a schematic diagram of contour points of a mark hole according to an embodiment of this application.

For example, FIG. 8 is a schematic diagram of contour points of a mark hole according to an embodiment of this application. A point in a white ring contour shown in FIG. 8 is the pixel with a largest pixel gradient change value in the target image, namely, the contour point of the mark hole.

S203: Generate a circle center set of auxiliary circles by using the contour points as circle centers of the auxiliary circles.

The auxiliary circle is used to position the circle center of the mark hole in the target image.

In some embodiments, each contour point may be represented by pixel coordinates corresponding to the contour point. For example, a circle center set P of the auxiliary circle may be $\{(x_1, y_1), (x_2, y_2) \ldots (x_1, y_1) \ldots (x_n, y_n)\}$. Every coordinates in the set P are the pixel coordinates of each contour point.

In some embodiments, coordinates of the circle centers of the circle center set P of auxiliary circles may be integer coordinates.

S204: Traverse each circle center in the circle center set and each radius value in a radius set, and generate a plurality of auxiliary circles in the target image.

In this step, after generating the circle center set of the auxiliary circles, the assembly device may correspondingly obtain the radius set of the auxiliary circles, to traverse each circle center in the circle center set and each radius value in the radius set, and generate the plurality of auxiliary circles in the target image.

The radius set may be a preset radius set of the auxiliary circles, and the preset set of the auxiliary circles may be specifically set based on an actual situation. In some embodiments, a value range of radii in the radius set of the auxiliary circles may be between a maximum radius and a minimum radius of the mark hole, that is, the value of the radius in the radius set is less than or equal to the radius of the first positioning circle and greater than or equal to the radius of the second positioning circle. A difference between adjacent radii in the radius set of the auxiliary circles may be a fixed value, for example, 1 pixel unit.

Figure 9:
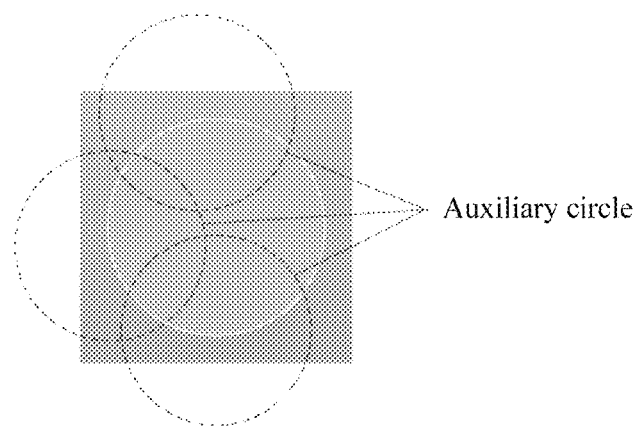
FIG. 9 is a schematic diagram of an auxiliary circle according to an embodiment of this application.

For example, FIG. 9 is a schematic diagram of an auxiliary circle according to an embodiment of this application. As shown in FIG. 9, the assembly device may successively extract the circle centers of the auxiliary circles from the circle center set P: $\{(x_1, y_1), (x_2, y_2) \ldots (x_1, y_1) \ldots (x_n, y_n)\}$. After a first circle center $(x_1, y_1)$ of the auxiliary circles is extracted, a radius in the radius set of the auxiliary circles may be traversed and extracted by using $(x_1, y_1)$ as a circle center, and the auxiliary circles are successively drawn in the target image. A formula of the auxiliary circle may be shown in formula (1):

$$(h-x_1)^2 + (w-y_1)^2 = z_1^2 \qquad (1),$$ where h is a first pixel coordinate (for example, a coordinate in a horizontal axis direction) in the target image, w is a second pixel coordinate (for example, a coordinate in a vertical axis direction) in the target image, $Z_1$ is a radius of an auxiliary circle, $R_{min}$ is the minimum radius of the mark hole, and $R_{max}$ is the maximum radius of the mark hole.

It should be noted that an auxiliary circle is drawn on the target image by taking $R_{min}$ by using $Z_1$, and after the auxiliary circle is generated, a value of $Z_1$ is increased by 1, and an auxiliary circle is repeatedly drawn on the target image until the value of $Z_1$ is greater than $R_{max}$. Correspondingly, after auxiliary circles whose circle center is $(x_1, y_1)$ are traversed, each circle center may be successively extracted from the circle center set. The foregoing operations are repeatedly performed until all circle centers in the circle center set are extracted.

S205: Accumulate, for different radius values of the auxiliary circles, a quantity of times of intersection between pixels in the target image and the plurality of auxiliary circles.

In this step, after generating the plurality of auxiliary circles in the target image, the assembly device may accumulate, for the different radius values of the auxiliary circles, the quantity of times of intersection between the pixels in the target image and the plurality of auxiliary circles.

It should be noted that the accumulating a quantity of times of intersection between pixels and the plurality of auxiliary circles may be understood as counting, for each radius value, a quantity of auxiliary circles that pass through a same pixel.

For example, the assembly device may establish a three-dimensional space matrix (h, w, r), and an initial value of the three-dimensional space matrix is 0. h is a first pixel coordinate in the target image, w is a second pixel coordinate in the target image, and r is a corresponding radius value.

When the quantity of intersection times is counted, for a circle in formula (1), if r is $R_{min}$, a three-dimensional space all-0 matrix corresponding to intersection between an auxiliary circle and coordinates $(h_0, w_0)$ of a pixel is $(h_0, w_0, R_{min})$. When an auxiliary circle whose r is $R_{max}$ every time passes through $(h_0, w_0)$, a value of the three-dimensional space matrix $(h_0, w_0, R_{min})$ is increased by 1 by using formula (2).

$$\text{Count}(h_0, w_0, R_{min}) = \text{Count}(h_0, w_0, R_{min}) + 1 \quad (2), \text{ where}$$

$[\sqrt{(h_0-x_1)^2+(w_0-y_1)^2}]=R_{min}$, and $\text{Count}(h_0, w_0, R_{min})$ is a count value of the three-dimensional space matrix $(h_0, w_0, R_{min})$.

It should be understood that in auxiliary circles corresponding to each circle center, after a quantity of times of intersection between the pixels and the auxiliary circles is counted for one radius value, a radius value $Z_1$ may be increased by 1, that is, $Z_1=R_{min}+1$, and the foregoing steps are repeated to count a count value of $\text{Count}(h_0, w_0, R_{min}+1)$.

It should be understood that in this embodiment of this application, count values of three-dimensional space matrices of each circle center point for the different radius values may be counted, to determine the quantity of times of intersection between the pixels and the plurality of auxiliary circles.

For example, a count value of a three-dimensional space matrix may be shown in formula (3):

$$\text{Count}(h, w, r) = \sum_{i=1}^{n} \left(1 - \rho_i \,\&\&\, \left(\left[\sqrt{(h-x_i)^2+(w-y_i)^2}\right] \% r\right)\right), \quad (3)$$

where $(x_i, y_i) \in P$, and $(xi, yi) \in P, \rho_i = \begin{cases} 0, & \left[\sqrt{(h-x_i)^2+(w-y_i)^2}\right] \% r = 0 \\ 1, & \left[\sqrt{(h-x_i)^2+(w-y_i)^2}\right] \% r \neq 0 \end{cases}$, where $P$ is the foregoing circle center set.

S206: Determine sub-pixel positioning information of the mark hole based on a first pixel that is in the pixels and that has a largest quantity of intersection times with the plurality of auxiliary circles and a radius value of an auxiliary circle corresponding to the first pixel.

In some embodiments, the assembly device may first determine sub-pixel positioning information of the mark hole based on a first pixel that is in the pixels and that has a largest quantity of intersection times with the plurality of auxiliary circles and a radius value of an auxiliary circle corresponding to the first pixel, where the sub-pixel positioning information includes pixel coordinates of the circle center of the mark hole and a radius of the mark hole. Then, the assembly device converts the sub-pixel positioning information of the mark hole into mechanical positioning information of the mark hole.

The foregoing sub-pixel positioning information may be location information of the mark hole on the raw image or the target image, and the sub-pixel positioning information includes the pixel coordinates of the circle center of the mark hole and the radius of the mark hole.

In some embodiments, the assembly device may determine the sub-pixel positioning information of the mark hole by using a first matrix corresponding to the first pixel and a neighborhood matrix of the first matrix. The assembly device may first generate the first matrix corresponding to the first pixel, the first matrix includes three-dimensional information, and the three-dimensional information includes coordinates of the first pixel in two directions and the radius value of the auxiliary circle corresponding to the first pixel. Next, the assembly device may determine a neighborhood matrix corresponding to single-dimensional information in the three-dimensional information. Then, the assembly device may separately determine sub-pixel positioning information corresponding to the three-dimensional information based on the neighborhood matrix corresponding to the single-dimensional information and the first matrix. Finally, the assembly device may determine the sub-pixel positioning information of the mark hole based on the sub-pixel positioning information corresponding to the three-dimensional information.

It should be understood that a type of the first matrix is not limited in this embodiment of this application, provided that the coordinates of the first pixel in the two directions and the radius value of the auxiliary circle corresponding to the first pixel are included. In some embodiments, the first matrix may be the foregoing three-dimensional space matrix.

The neighborhood matrix includes a first neighborhood matrix and a second neighborhood matrix, target dimension information in the first neighborhood matrix is less than target dimension information in the first matrix, target dimension information in the second neighborhood matrix is greater than the target dimension information in the first matrix, and the target dimension information is dimension information corresponding to the first neighborhood matrix and the second neighborhood matrix.

Correspondingly, the assembly device may determine a second matrix from the first neighborhood matrix corresponding to the single-dimensional information, and determine a third matrix from the second neighborhood matrix corresponding to the single-dimensional information. Then, the assembly device may fit, by using a Gaussian distribution model, the first matrix, the second matrix, and the third matrix that correspond to the single-dimensional information, to separately determine the sub-pixel positioning information corresponding to the three-dimensional information.

Figure 10:
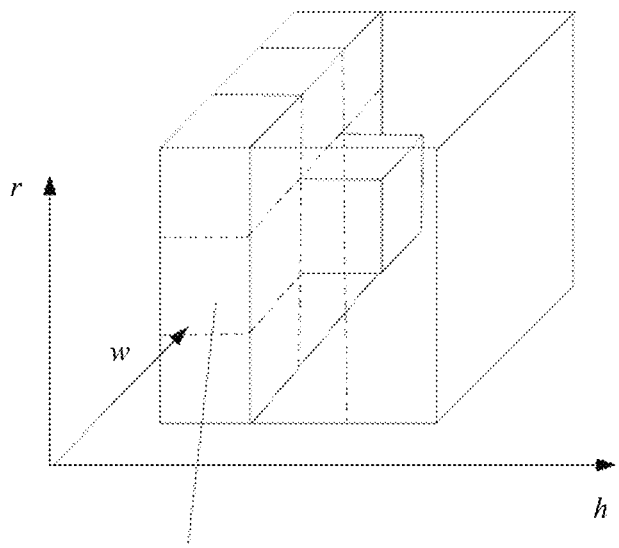
FIG. 10 is a schematic diagram of a neighborhood of a first matrix according to an embodiment of this application.

In some embodiments, the first matrix may be $(h_{max}, w_{max}, r_{max})$, where $(h_{max}, w_{max})$ is integer coordinates of a circle center of a to-be-fitted circle, and $r_{max}$ is an integer radius of the circle center of the to-be-fitted circle. FIG. 10 is a schematic diagram of a neighborhood of a first matrix according to an embodiment of this application. As shown in FIG. 10, the assembly device may extract count values of nine 3*3*3 neighborhoods on a left side around the first matrix as follows: $(h_{max}-1, w_{max}-1, r_{max}+1)$, $(h_{max}-1, w_{max}, r_{max}+1)$, $(h_{max}-1, w_{max}+1, r_{max}+1)$, $(h_{max}-1, w_{max}-1, r_{max})$, $(h_{max}-1, w_{max}, r_{max})$, $(h_{max}-1, w_{max}+1, r_{max})$, $(h_{max}-1, w_{max}-1, r_{max}-1)$, $(h_{max}-1, w_{max}, r_{max}-1)$, and $(h_{max}-1, w_{max}+1, r_{max}-1)$.

Then, first dimensional information h is used as an example, and the assembly device may determine a maximum value $\text{Count}(h_l)$ of a left neighborhood $h_l$ from the nine count values of a left neighborhood matrix. Correspondingly, the assembly device may extract count values of nine 3*3*3 neighborhoods on a right side around the first matrix, and determine a maximum value $\text{Count}(h_r)$ of a right neighborhood $h_r$ from the nine count values of a right neighborhood matrix.

Figure 11:
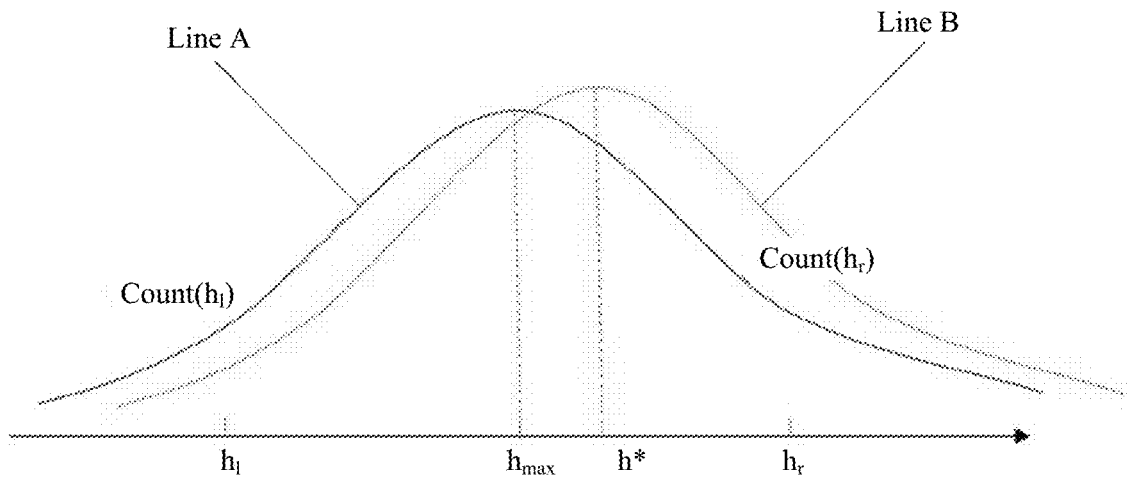
FIG. 11 is a schematic diagram of Gaussian model distribution according to an embodiment of this application.
Figure 12A:
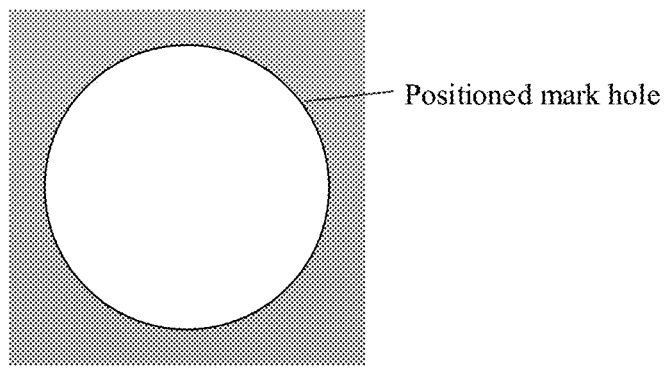
FIG. 12A-FIG. 12D are a schematic diagram of a positioning effect of a mark hole according to an embodiment of this application.
Figure 12B:
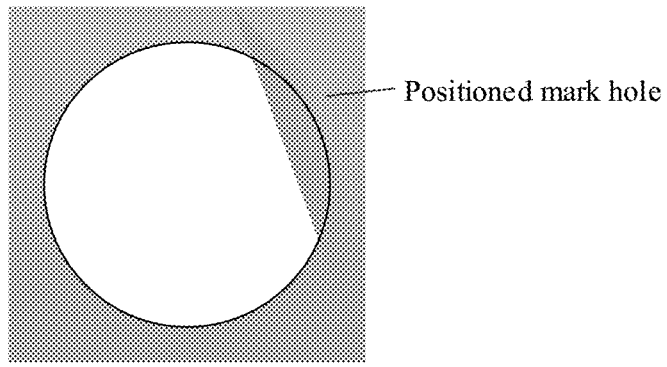
Figure 12C:
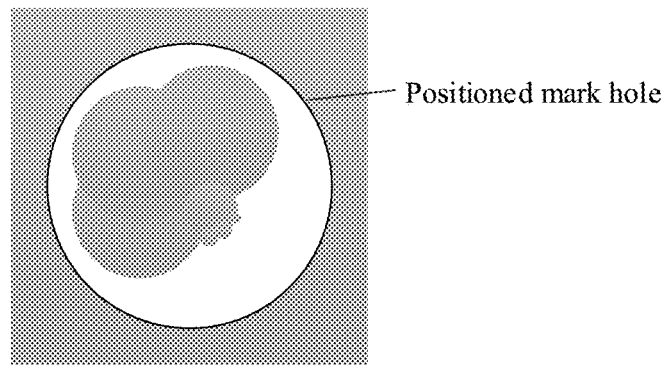
Figure 12D:
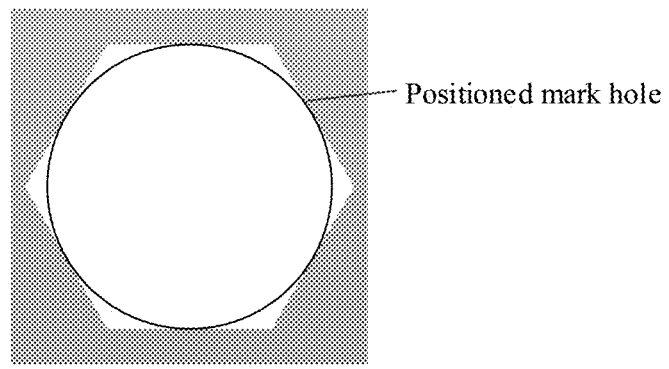

FIG. 11 is a schematic diagram of Gaussian model distribution according to an embodiment of this application. As shown in FIG. 11, a quantity of statistical points gradually decreases from a circle center to the periphery and presents the Gaussian model distribution. A line A in FIG. 11 is an ideal Gaussian distribution model u=$h_{max}$*Count($h_1$)=Count ($h_r$). However, actual count values Count($h_1$) and Count($h_r$) may be unequal. In this case, a parameter μ in a Gaussian model is shifted to a location of h*, namely, a line B. In this case, μ=h* in the Gaussian model (namely, sub-pixel coordinates of an h-axis of a circle).

Values of three points ($h_1$, Count($h_1$)), ($h_{max}$, Count($h_{max}$)), and ($h_r$, Count($h_r$)) are substituted into formula (4), to deduce formula (5) and obtain a value of μ. The sub-pixel coordinates h* corresponding to h may be determined by obtaining the value of μ.

$$f(h) = \delta_{max} \cdot \exp\left\{-\left(\frac{(h-\mu)^2}{2\sigma^2}\right)\right\} \quad (4)$$

$$h* = \mu = h_{max} - \frac{1}{2} + \frac{1}{\frac{\ln\text{count}(h_{max}) - \ln\text{count}(h_r)}{\ln\text{count}(h_{max}) - \ln\text{count}(h_l)} + 1} \quad (5)$$

It should be noted that the maximum value of the nine neighborhoods obtained above may alternatively be replaced with an average value or a median, which may be specifically set based on an actual situation. This is not limited in this embodiment of this application.

It should be noted that for the other two-dimensional sub-pixel coordinates w* and r*, reference may be made to a calculation manner of h*. Details are not described herein again. Table 1 is a schematic diagram of a result of sub-pixel detection data. As shown in Table 1, determining sub-pixel coordinates by using the foregoing Gaussian model distribution can improve precision of the sub-pixel coordinates.

TABLE 1

| Serial number | Actual circle center x-axis | Actual circle center y-axis | Actual radius | Detected circle center x-axis | Detected circle center y-axis | x-axis error | y-axis error |
|---|---|---|---|---|---|---|---|
| 1 | 116.449 | 91.361 | 63.330 | 116.438 | 91.338 | 0.011 | 0.024 |
| 2 | 81.775 | 111.816 | 67.983 | 81.890 | 111.881 | 0.115 | 0.065 |
| 3 | 108.372 | 90.767 | 56.838 | 108.280 | 90.848 | 0.092 | 0.081 |
| 4 | 108.830 | 119.862 | 94.009 | 108.700 | 119.673 | 0.130 | 0.189 |
| 5 | 116.382 | 119.249 | 54.925 | 116.114 | 119.060 | 0.268 | 0.188 |
| 6 | 104.052 | 104.599 | 84.043 | 103.937 | 104.548 | 0.114 | 0.050 |
| 7 | 92.621 | 97.325 | 95.875 | 92.687 | 97.253 | 0.066 | 0.072 |
| 8 | 85.055 | 84.859 | 65.921 | 85.050 | 84.897 | 0.005 | 0.037 |
| 9 | 101.690 | 103.354 | 88.048 | 101.802 | 103.191 | 0.112 | 0.163 |
| 10 | 89.608 | 116.584 | 91.887 | 89.709 | 116.657 | 0.101 | 0.073 |
| | X-axis average error | 0.102 | Y axis average error | 0.094 | Unit: pixel | | |

It should be noted that the foregoing sub-pixel coordinates fitted and determined by using the Gaussian distribution model do not constitute a limitation on this application. In some embodiments, fitting may be implemented in another manner which replaces the Gaussian distribution model, for example, a center interpolation method.

In some embodiments, the assembly device may determine sub-pixel coordinates of the first pixel in two directions as pixel coordinates of the circle center of the mark hole, and determine the radius value of the auxiliary circle corresponding to the first pixel as the radius of the mark hole.

S207: Position the mark hole based on the sub-pixel positioning information of the mark hole.

The foregoing mechanical positioning information may be positioning information of the mark hole on the assembly device.

It should be understood that how to convert the sub-pixel positioning information into the mechanical positioning information is not limited in this embodiment of this application. In some embodiments, a mapping relationship between sub-pixel positioning information and mechanical positioning information may be preset. According to the mapping relationship, the sub-pixel positioning information may be converted into the mechanical positioning information.

According to the mark hole positioning method provided in this application. the contour point of the mark hole is used as the circle center to draw the circle, and the pixel with the largest quantity of intersection times is counted as the circle center of the auxiliary circle, which can improve positioning robustness of the mark hole while ensuring positioning precision of the mark hole.

FIG. 12A-FIG. 12D are schematic diagrams of positioning effects of a mark hole according to an embodiment of this application. As shown in FIG. 12A-FIG. 12D. when there is an irregular edge such as a convex hull or a burr in the mark hole, or when the mark hole is partially shielded, the mark hole can still be relatively accurately positioned.

According to the mark hole positioning method provided in this embodiment of this application, an assembly device first obtains a target image including a to-be-positioned mark hole, and extracts contour points of the mark hole from the target image. Next, the assembly device generates a circle center set of auxiliary circles by using the contour points as circle centers of the auxiliary circles. Then, the assembly device traverses each circle center in the circle center set and each radius value in a radius set, generates a plurality of auxiliary circles in the target image, and accumulates, for different radius values of the auxiliary circles, a quantity of times of intersection between pixels in the target image and the plurality of auxiliary circles. Finally, the mark hole is positioned based on a first pixel that is in the pixels and that has a largest quantity of intersection times with the plurality of auxiliary circles and a radius value of an auxiliary circle corresponding to the first pixel. The plurality of auxiliary circles are generated on the target image by using contour points of a mark hole as circle centers of auxiliary circles, so that a quantity of times of intersection between the auxiliary circles and pixels in the target image is used to determine sub-pixel positioning information of the mark hole, where the sub-pixel positioning information includes pixel coordinates of the circle center of the mark hole and a radius of the mark hole. The mark hole is positioned based on the sub-pixel positioning information of the mark hole. When there is an irregular edge such as a convex hull or a burr in the mark hole, or when the mark hole is partially shielded, because most contour points of the mark hole are regularly distributed, the quantity of times of intersection between the auxiliary circles and the pixels in the target image is relatively slightly affected, and positioning precision of the mark hole is also relatively slightly affected. Therefore, the mark hole positioning method provided in this application improves positioning robustness of the mark hole while ensuring positioning precision of the mark hole.

Figure 13:
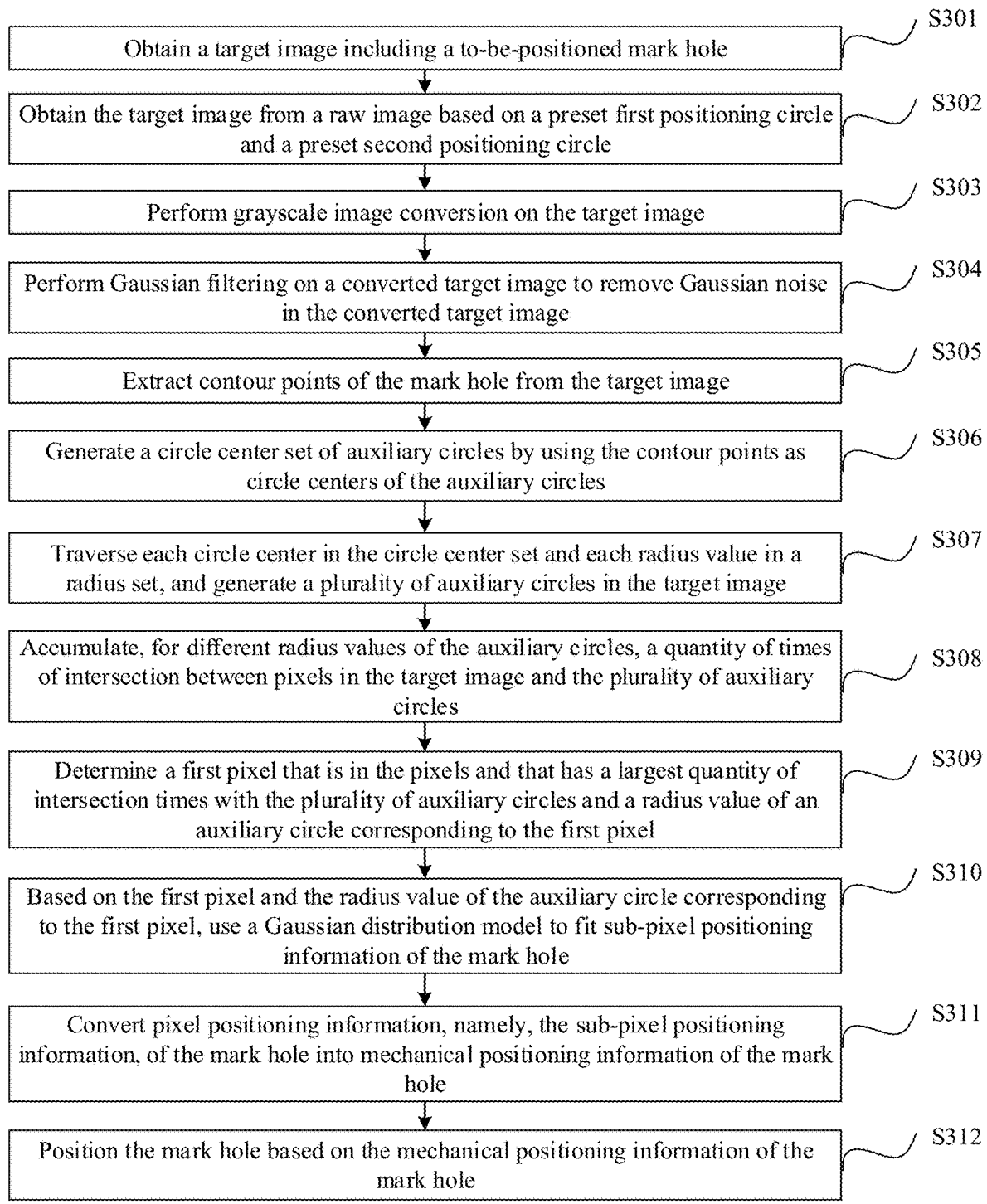
FIG. 13 is a schematic flowchart of another mark hole positioning method according to an embodiment of this application.

FIG. 13 is a schematic flowchart of another mark hole positioning method according to an embodiment of this application. The mark hole positioning method provided in this embodiment is applied to an assembly device, to position a mark hole on a to-be-assembled object. As shown in FIG. 13, the mark hole positioning method includes the following steps:

S301: Obtain a raw image of the mark hole.

S302: Obtain the target image from the raw image based on a preset first positioning circle and a preset second positioning circle.

A radius of the first positioning circle is a maximum radius of the mark hole, and a radius of the second positioning circle is a minimum radius of the mark hole.

S303: Perform grayscale image conversion on the target image.

S304: Perform Gaussian filtering on a converted target image to remove Gaussian noise in the converted target image.

S305: Extract contour points of the mark hole from the target image.

S306: Generate a circle center set of auxiliary circles by using the contour points as circle centers of the auxiliary circles, where the auxiliary circle is used to position a circle center of the mark hole in the target image.

S307: Traverse each circle center in the circle center set and each radius value in a radius set, and generate a plurality of auxiliary circles in the target image.

S308: Accumulate, for different radius values of the auxiliary circles, a quantity of times of intersection between pixels in the target image and the plurality of auxiliary circles.

S309: Determine a first pixel that is in the pixels and that has a largest quantity of intersection times with the plurality of auxiliary circles and a radius value of an auxiliary circle corresponding to the first pixel.

S310: Based on the first pixel and the radius value of the auxiliary circle corresponding to the first pixel, use a Gaussian distribution model to fit sub-pixel positioning information of the mark hole, where the sub-pixel positioning information includes pixel coordinates of the circle center of the mark hole and a radius of the mark hole.

S311: Convert the sub-pixel positioning information of the mark hole into mechanical positioning information of the mark hole.

S312: Position the mark hole based on the mechanical positioning information of the mark hole.

According to the mark hole positioning method provided in this embodiment of this application, the plurality of auxiliary circles are generated on the target image by using the contour points of the mark hole as the circle centers of the auxiliary circles, so that the quantity of times of intersection between the auxiliary circles and the pixels in the target image is used to position the mark hole. When there is an irregular edge such as a convex hull or a burr in the mark hole, or when the mark hole is partially shielded, because most contour points of the mark hole are regularly distributed, the quantity of times of intersection between the auxiliary circles and the pixels in the target image is relatively slightly affected, and positioning precision of the mark hole is also relatively slightly affected. Therefore, the mark hole positioning method provided in this application improves positioning robustness of the mark hole while ensuring positioning precision of the mark hole.

A person of ordinary skill in the art may understand that all or some of the steps of the foregoing method embodiments may be implemented by using hardware related to program instructions, the foregoing program may be stored in a computer-readable storage medium. When the program is executed, the steps including the foregoing method embodiments are performed. The foregoing storage medium includes any medium that can store program code, such as a ROM, a RAM, a magnetic disk, or an optical disc.

Figure 14:
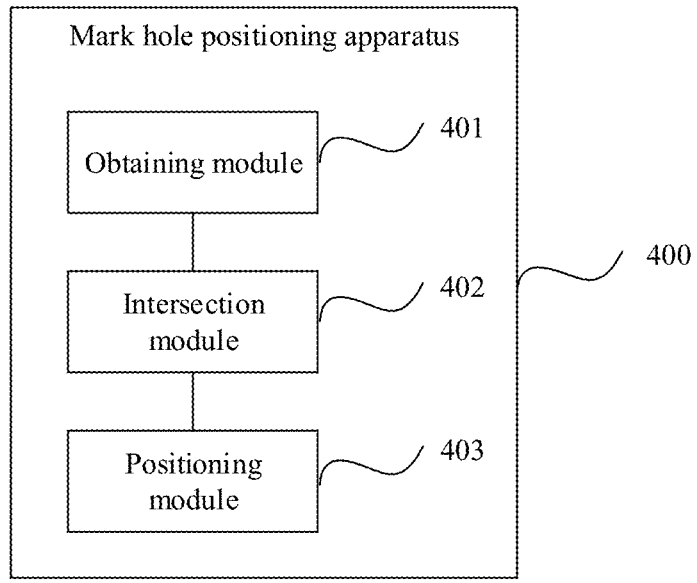
FIG. 14 is a schematic diagram of a structure of a mark hole positioning apparatus according to an embodiment of this application.

FIG. 14 is a schematic diagram of a structure of a mark hole positioning apparatus according to an embodiment of this application. The mark hole positioning apparatus may be implemented by using software, hardware, or a combination thereof, for example, the assembly device in the foregoing embodiments or the processor of the assembly device, to perform the mark hole positioning method in the foregoing embodiments. As shown in FIG. 14, the mark hole positioning apparatus 400 includes an obtaining module 401, an intersection module 402, and a positioning module 403.

The obtaining module 401 is configured to obtain a target image including a to-be-positioned mark hole.

The intersection module 402 is configured to extract contour points of the mark hole from the target image: generate a circle center set of auxiliary circles by using the contour points as circle centers of the auxiliary circles, where the auxiliary circle is used to position a circle center of the mark hole in the target image: and traverse each circle center in the circle center set and each radius value in a radius set, and generate a plurality of auxiliary circles in the target image.

The positioning module 403 is configured to accumulate, for different radius values of the auxiliary circles, a quantity of times of intersection between pixels in the target image and the plurality of auxiliary circles: determine sub-pixel positioning information of the mark hole based on a first pixel that is in the pixels and that has a largest quantity of intersection times with the plurality of auxiliary circles and a radius value of an auxiliary circle corresponding to the first pixel, where the sub-pixel positioning information includes pixel coordinates of the circle center of the mark hole and a radius of the mark hole; and position the mark hole based on the sub-pixel positioning information of the mark hole.

In an optional implementation, the obtaining module 401 is specifically configured to obtain a raw image of the mark hole; and obtain the target image from the raw image based on a preset first positioning circle and a preset second positioning circle.

A radius of the first positioning circle is a maximum radius of the mark hole, and a radius of the second positioning circle is a minimum radius of the mark hole.

In an optional implementation, the obtaining module 401 is specifically configured to pre-position, by including the mark hole in the first positioning circle, a target region in which the mark hole is located; use the second positioning circle to check whether a radius of the mark hole in the target region is greater than or equal to the minimum radius; and if yes, capture an image of the target region from the raw image to generate the target image.

In an optional implementation, the obtaining module 401 is further configured to: if no, determine that the mark hole in the target region is an invalid mark hole.

In an optional implementation, the target image is a square image, and a side length of the square image is equal to a diameter of the first positioning circle.

In an optional implementation, the radius value in the radius set is less than or equal to the radius of the first positioning circle and greater than or equal to the radius of the second positioning circle.

In an optional implementation, the obtaining module 401 is further configured to perform grayscale image conversion on the target image; and perform Gaussian filtering on a converted target image to remove Gaussian noise in the converted target image.

In an optional implementation, the intersection module 402 is specifically configured to calculate a pixel gradient change value of each pixel in the target image by using a gradient operator; and determine a pixel with a largest pixel gradient change value in the target image as the contour point.

In an optional implementation, the positioning module 403 is specifically configured to convert the sub-pixel positioning information of the mark hole into mechanical positioning information of the mark hole; and position the mark hole based on the mechanical positioning information of the mark hole.

In an optional implementation, the positioning module 403 is specifically configured to generate a first matrix corresponding to the first pixel, where the first matrix includes three-dimensional information, and the three-dimensional information includes coordinates of the first pixel in two directions and the radius value of the auxiliary circle corresponding to the first pixel; determine a neighborhood matrix corresponding to single-dimensional information in the three-dimensional information; separately determine sub-pixel positioning information corresponding to the three-dimensional information based on the neighborhood matrix corresponding to the single-dimensional information and the first matrix; and determine the sub-pixel positioning information of the mark hole based on the sub-pixel positioning information corresponding to the three-dimensional information.

In an optional implementation, the neighborhood matrix includes a first neighborhood matrix and a second neighborhood matrix, target dimension information in the first neighborhood matrix is less than target dimension information in the first matrix, target dimension information in the second neighborhood matrix is greater than the target dimension information in the first matrix, and the target dimension information is dimension information corresponding to the first neighborhood matrix and the second neighborhood matrix.

In an optional implementation, the positioning module 403 is specifically configured to determine a second matrix from the first neighborhood matrix corresponding to the single-dimensional information, and determine a third matrix from the second neighborhood matrix corresponding to the single-dimensional information, and fit, by using a Gaussian distribution model, the first matrix, the second matrix, and the third matrix that correspond to the single-dimensional information, to separately determine the sub-pixel positioning information corresponding to the three-dimensional information.

In an optional implementation, the positioning module 403 is specifically configured to determine sub-pixel coordinates of the first pixel in two directions as the pixel coordinates of the circle center of the mark hole; and determine the radius value of the auxiliary circle corresponding to the first pixel as the radius of the mark hole.

It should be noted that the mark hole positioning apparatus provided in the embodiment shown in FIG. 14 can be configured to perform the method provided in any one of the foregoing embodiments. There are similar specific implementations and technical effects. Details are not described herein again.

Figure 15:
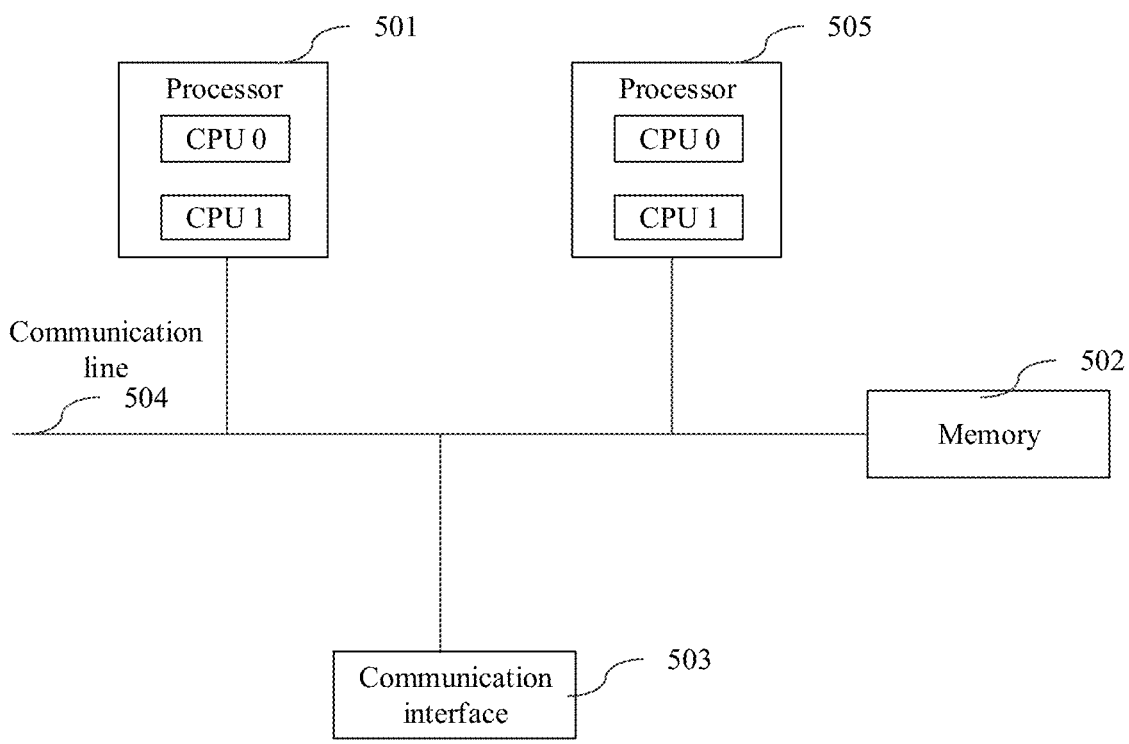
FIG. 15 is a schematic diagram of a hardware structure of a terminal device according to an embodiment of this application.

FIG. 15 is a schematic diagram of a hardware structure of a terminal device according to an embodiment of this application. As shown in FIG. 15, the terminal device includes a processor 501, a communication line 504, and at least one communication interface (for example, in FIG. 15, a communication interface 503 is used as an example for description). The terminal device may be the foregoing assembly device.

The processor 501 may be a general-purpose central processing unit (central processing unit, CPU), a microprocessor, an application-specific integrated circuit (application-specific integrated circuit, ASIC), or one or more integrated circuits for controlling program execution in the solutions of this application.

The communication line 504 may include a circuit for transmitting information between the foregoing components.

The communication interface 503 uses any apparatus such as a transceiver to communicate with another device or a communication network, such as an Ethernet or a wireless local area network (wireless local area networks, WLAN).

Possibly, the terminal device may further include a memory 502.

The memory 502 may be a read-only memory (read-only memory, ROM) or another type of static storage device capable of storing static information and instructions, a random access memory (random access memory, RAM) or another type of dynamic storage device capable of storing information and instructions, or an electrically erasable programmable read-only memory (electrically erasable programmable read-only memory, EEPROM), a compact disc read-only memory (compact disc read-only memory, CD-ROM) or another optical disc memory, a compact disc memory (including a compact disc, a laser disc, an optical disc, a digital versatile disc, a Blu-ray disc, and the like), a magnetic disk storage medium or another magnetic storage device, or any other medium that can be used to carry or store desired program code in the form of instructions or data structures and that can be accessed by a computer, but is not limited thereto. The memory may exist independently, and is connected to the processor by using the communication line 504. The memory may alternatively be integrated with the processor.

The memory 502 is configured to store computer-executable instructions for performing the solution in this application, and the processor 501 controls execution. The processor 501 is configured to execute the computer-executable instructions stored in the memory 502 to implement the mark hole positioning method provided in the embodiments of this application.

Possibly, the computer-executable instructions in this embodiment of this application may also be referred to as application program code. This is not specifically limited in this embodiment of this application.

During specific implementation, in an embodiment, the processor 501 may include one or more CPUs, such as a CPU 0 and a CPU 1 in FIG. 5.

During specific implementation, in an embodiment, the terminal device may include a plurality of processors, such as a processor 501 and a processor 505 in FIG. 5. Each of these processors may be a single-core (single-CPU) processor or a multi-core (multi-CPU) processor. The processor herein may refer to one or more devices, circuits, and/or processing cores configured to process data (for example, computer program instructions).

Figure 16:
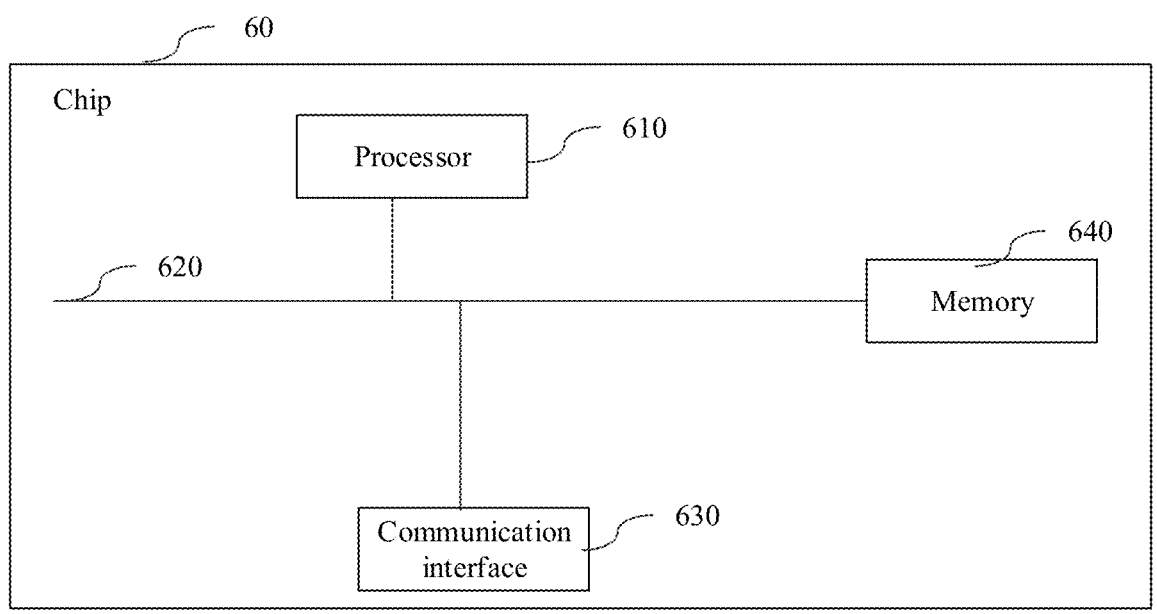
FIG. 16 is a schematic diagram of a structure of a chip according to an embodiment of this application.

For example, FIG. 16 is a schematic diagram of a structure of a chip according to an embodiment of this application. A chip 60 includes one or more than two (including two) processors 610 and a communication interface 630.

In some implementations, a memory 640 stores the following elements: an executable module or a data structure, or subsets thereof, or extended sets thereof.

In this embodiment of this application, the memory 640 may include a read-only memory and a random access memory, and provide instructions and data for the processor 610. A part of the memory 640 may further include a non-volatile random access memory (non-volatile random access memory, NVRAM).

In this embodiment of this application, the memory 640, the communication interface 630, and the memory 640 are coupled together by using a bus system 620. The bus system 620 may further include a power bus, a control bus, and a status signal bus in addition to a data bus. For convenience of description, various buses are marked as the bus system 620 in FIG. 6.

The method described in the foregoing embodiments of this application may be applied to the processor 610, or may be implemented by the processor 610. The processor 610 may be an integrated circuit chip having a capability of processing a signal. During implementation, the steps of the method may be performed by using an integrated logic circuit of hardware in the processor 610 or by using instructions in a form of software. The processor 610 may be a general-purpose processor (for example, a microprocessor or a conventional processor), a digital signal processor (digital signal processing, DSP), an application-specific integrated circuit (application specific integrated circuit, ASIC), a field-programmable gate array (field-programmable gate array, FPGA) or another programmable logic device, a discrete gate, or a transistor logic device or a discrete hardware component. The processor 610 may implement or perform the methods, steps, and logical block diagrams disclosed in the embodiments of this application.

The steps of the method disclosed in embodiments of this application may be directly performed by a hardware decoding processor, or by a combination of hardware and software modules in the decoding processor. The software module may be located in a mature storage medium in the art, for example, a random access memory, a read-only memory, a programmable read-only memory, or an electrically erasable programmable read only memory (electrically erasable programmable read only memory, EEPROM). The storage medium is located in the memory 640, and the processor 610 reads information in the memory 640 and completes the steps of the foregoing method in combination with hardware in the processor.

In the foregoing embodiments, the instructions stored in the memory for execution by the processor may be implemented in a form of a computer program product. The computer program product may be pre-written in the memory, or may be downloaded and installed in the memory in a form of software.

The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (digital subscriber line, DSL)) manner or a wireless (for example, infrared, radio, or microwave) manner. The computer-readable storage medium may be any available medium accessible by a computer, or a data storage device, for example, a server or a data center, integrating one or more available media. For example, the available medium may include a magnetic medium (for example, a floppy disk, a hard disk, or a magnetic tape), an optical medium (for example, a digital versatile disc (digital versatile disc, DVD)), a semiconductor medium (for example, a solid state disk (solid state disk, SSD)), or the like.

An embodiment of this application further provides a computer-readable storage medium. The method described in the foregoing embodiments may be completely or partially implemented by using software, hardware, firmware, or any combination thereof. The computer-readable medium may include a computer storage medium and a communication medium, and may further include any medium that enables a computer program to be transmitted from one place to another place. The storage medium may be any target medium accessible by a computer.

In a possible design, the computer-readable medium may include a compact disc read-only memory (compact disc read-only memory, CD-ROM), a RAM, a ROM, an EEPROM, or another optical disc memory; and the computer-readable medium may include a magnetic disk memory or another magnetic disk storage device. In addition, any connecting line may also be appropriately referred to as a computer-readable medium. For example, if software is transmitted from a website, a server, or another remote source by using a coaxial cable, an optical fiber cable, a twisted pair, a DSL, or wireless technologies (for example, infrared, radio, and microwave), the coaxial cable, the optical fiber cable, the twisted pair, the DSL, or the wireless technologies such as infrared, radio, and microwave are included in the definition of the medium. As used herein, a magnetic disk and an optical disc include a compact disc (CD), a laser disc, an optical disc, a digital versatile disc (digital versatile disc, DVD), a floppy disk, and a Blu-ray disc. The magnetic disk usually reproduces data in a magnetic manner, and the optical disc reproduces data optically by using laser.

A combination of the foregoing should also be included in the scope of the computer-readable medium. The foregoing descriptions are merely specific implementations of this application, and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A mark hole positioning method, wherein the method comprises:
   obtaining a target image comprising a to-be-positioned mark hole;
   extracting contour points of the mark hole from the target image;
   generating a circle center set of auxiliary circles by using the contour points as circle centers of the auxiliary circles, wherein the auxiliary circle is used to position a circle center of the mark hole in the target image;
   traversing each circle center in the circle center set and each radius value in a radius set of the auxiliary circles, and generating a plurality of auxiliary circles in the target image;
   accumulating, for different radius values of the auxiliary circles, a quantity of times of intersection between pixels in the target image and the plurality of auxiliary circles;
   determining sub-pixel positioning information of the mark hole based on a first pixel that is in the pixels and that has a largest quantity of intersection times with the plurality of auxiliary circles and a radius value of an auxiliary circle corresponding to the first pixel, wherein the sub-pixel positioning information comprises pixel coordinates of the circle center of the mark hole and a radius of the mark hole; and
   positioning the mark hole based on the sub-pixel positioning information of the mark hole.

2. The method according to claim 1, wherein the obtaining a target image comprising a to-be-positioned mark hole comprises:
   obtaining a raw image of the mark hole; and
   obtaining the target image from the raw image based on a preset first positioning circle and a preset second positioning circle, wherein
   a radius of the first positioning circle is a maximum radius of the mark hole, and a radius of the second positioning circle is a minimum radius of the mark hole.

3. The method according to claim 2, wherein the obtaining the target image from the raw image based on a preset first positioning circle and a preset second positioning circle comprises:
   pre-positioning, by comprising the mark hole in the first positioning circle, a target region in which the mark hole is located;
   checking, by using the second positioning circle, whether a radius of the mark hole in the target region is greater than or equal to the minimum radius; and
   if the radius of the mark hole in the target region is greater than or equal to the minimum radius, capturing an image of the target region from the raw image to generate the target image.

4. The method according to claim 3, wherein after the checking, by using the second positioning circle, whether a radius of the mark hole in the target region is greater than or equal to the minimum radius, the method further comprises:
   if the radius of the mark hole in the target region is not greater than or equal to the minimum radius, determining that the mark hole in the target region is an invalid mark hole.

5. The method according to claim 2, wherein the target image is a square image, and a side length of the square image is equal to a diameter of the first positioning circle.

6. The method according to claim 2, wherein the radius value in the radius set is less than or equal to the radius of the first positioning circle and greater than or equal to the radius of the second positioning circle.

7. The method according to claim 1, wherein before the extracting contour points of the mark hole from the target image, the method further comprises:
   performing grayscale image conversion on the target image; and
   performing Gaussian filtering on a converted target image to remove Gaussian noise in the converted target image.

8. The method according to claim 7, wherein the extracting contour points of the mark hole from the target image comprises:
   calculating a pixel gradient change value of each pixel in the target image by using a gradient operator; and
   determining a pixel with a largest pixel gradient change value in the target image as the contour point.

9. The method according to claim 8, wherein the positioning the mark hole based on the sub-pixel positioning information of the mark hole comprises:
   converting the sub-pixel positioning information of the mark hole into mechanical positioning information of the mark hole; and
   positioning the mark hole based on the mechanical positioning information of the mark hole.

10. The method according to claim 9, wherein the determining sub-pixel positioning information of the mark hole based on a first pixel that is in the pixels and that has a largest quantity of intersection times with the plurality of auxiliary circles and a radius value of an auxiliary circle corresponding to the first pixel comprises:
    generating a first matrix corresponding to the first pixel, wherein the first matrix comprises three-dimensional information, and the three-dimensional information comprises coordinates of the first pixel in two directions and the radius value of the auxiliary circle corresponding to the first pixel;
    determining a neighborhood matrix corresponding to single-dimensional information in the three-dimensional information;
    separately determining sub-pixel positioning information corresponding to the three-dimensional information based on the neighborhood matrix corresponding to the single-dimensional information and the first matrix; and
    determining the sub-pixel positioning information of the mark hole based on the sub-pixel positioning information corresponding to the three-dimensional information.

11. The method according to claim 10, wherein the neighborhood matrix comprises a first neighborhood matrix and a second neighborhood matrix, target dimension information in the first neighborhood matrix is less than target dimension information in the first matrix, target dimension information in the second neighborhood matrix is greater than the target dimension information in the first matrix, and the target dimension information is dimension information corresponding to the first neighborhood matrix and the second neighborhood matrix.

12. The method according to claim 11, wherein the separately determining sub-pixel positioning information corresponding to the three-dimensional information based on the neighborhood matrix corresponding to the single-dimensional information and the first matrix comprises:

determining a second matrix from the first neighborhood matrix corresponding to the single-dimensional information, and determining a third matrix from the second neighborhood matrix corresponding to the single-dimensional information; and fitting, by using a Gaussian distribution model, the first matrix, the second matrix, and the third matrix that correspond to the single-dimensional information, to separately determine the sub-pixel positioning information corresponding to the three-dimensional information.

13. The method according to claim 10, wherein the determining the sub-pixel positioning information of the mark hole based on the sub-pixel positioning information corresponding to the three-dimensional information comprises:

determining sub-pixel coordinates of the first pixel in two directions as the pixel coordinates of the circle center of the mark hole; and determining the radius value of the auxiliary circle corresponding to the first pixel as the radius of the mark hole.

14. An assembly device, comprising a memory, a processor, and a computer program stored in the memory and capable of running on the processor, wherein when the processor executes the computer program, the assembly device is enabled to perform a mark hole positioning method, wherein the method comprises:

obtaining a target image comprising a to-be-positioned mark hole;

extracting contour points of the mark hole from the target image;

generating a circle center set of auxiliary circles by using the contour points as circle centers of the auxiliary circles, wherein the auxiliary circle is used to position a circle center of the mark hole in the target image;

traversing each circle center in the circle center set and each radius value in a radius set of the auxiliary circles, and generating a plurality of auxiliary circles in the target image;

accumulating, for different radius values of the auxiliary circles, a quantity of times of intersection between pixels in the target image and the plurality of auxiliary circles;

determining sub-pixel positioning information of the mark hole based on a first pixel that is in the pixels and that has a largest quantity of intersection times with the plurality of auxiliary circles and a radius value of an auxiliary circle corresponding to the first pixel, wherein the sub-pixel positioning information comprises pixel coordinates of the circle center of the mark hole and a radius of the mark hole; and positioning the mark hole based on the sub-pixel positioning information of the mark hole.

15. A non-transitory computer-readable storage medium, wherein the computer-readable storage medium stores a computer program, and when the computer program is executed by a processor, a computer is enabled to perform a mark hole positioning method, wherein the method comprises:

obtaining a target image comprising a to-be-positioned mark hole;

extracting contour points of the mark hole from the target image;

generating a circle center set of auxiliary circles by using the contour points as circle centers of the auxiliary circles, wherein the auxiliary circle is used to position a circle center of the mark hole in the target image;

traversing each circle center in the circle center set and each radius value in a radius set of the auxiliary circles, and generating a plurality of auxiliary circles in the target image;

accumulating, for different radius values of the auxiliary circles, a quantity of times of intersection between pixels in the target image and the plurality of auxiliary circles;

determining sub-pixel positioning information of the mark hole based on a first pixel that is in the pixels and that has a largest quantity of intersection times with the plurality of auxiliary circles and a radius value of an auxiliary circle corresponding to the first pixel, wherein the sub-pixel positioning information comprises pixel coordinates of the circle center of the mark hole and a radius of the mark hole; and positioning the mark hole based on the sub-pixel positioning information of the mark hole.

16. The assembly device according to claim 14, wherein the obtaining a target image comprising a to-be-positioned mark hole comprises:

obtaining a raw image of the mark hole; and obtaining the target image from the raw image based on a preset first positioning circle and a preset second positioning circle, wherein a radius of the first positioning circle is a maximum radius of the mark hole, and a radius of the second positioning circle is a minimum radius of the mark hole.

17. The assembly device according to claim 16, wherein the obtaining the target image from the raw image based on a preset first positioning circle and a preset second positioning circle comprises:

pre-positioning, by comprising the mark hole in the first positioning circle, a target region in which the mark hole is located;

checking, by using the second positioning circle, whether a radius of the mark hole in the target region is greater than or equal to the minimum radius; and if the radius of the mark hole in the target region is greater than or equal to the minimum radius, capturing an image of the target region from the raw image to generate the target image.

18. The computer-readable storage medium according to claim 15, wherein the obtaining a target image comprising a to-be-positioned mark hole comprises:

obtaining a raw image of the mark hole; and obtaining the target image from the raw image based on a preset first positioning circle and a preset second positioning circle, wherein a radius of the first positioning circle is a maximum radius of the mark hole, and a radius of the second positioning circle is a minimum radius of the mark hole.

19. The computer-readable storage medium according to claim 18, wherein the obtaining the target image from the raw image based on a preset first positioning circle and a preset second positioning circle comprises:

pre-positioning, by comprising the mark hole in the first positioning circle, a target region in which the mark hole is located;

checking, by using the second positioning circle, whether a radius of the mark hole in the target region is greater than or equal to the minimum radius; and if the radius of the mark hole in the target region is greater than or equal to the minimum radius, capturing an image of the target region from the raw image to generate the target image.

\* \* \* \* \*